United States Patent [19]
Smith

[11] Patent Number: 5,525,112
[45] Date of Patent: Jun. 11, 1996

[54] COMBINED SEAL AND BOOT FOR STEERING SHAFT ASSEMBLY

[75] Inventor: Johnny N. Smith, Toledo, Ohio

[73] Assignee: Dana Corporation, Toledo, Ohio

[21] Appl. No.: 163,328

[22] Filed: Dec. 6, 1993

[51] Int. Cl.⁶ ............... F16C 3/03; F16D 3/06; F16D 3/84
[52] U.S. Cl. ............ 464/162; 277/134; 403/109; 464/175
[58] Field of Search .............. 464/172, 173, 464/175, 133, 162; 277/212 FB, 9, 189, 37, 136, 215; 280/777; 74/492; 403/109

[56] References Cited

U.S. PATENT DOCUMENTS

| | | |
|---|---|---|
| 2,761,295 | 9/1956 | Davis ................... 464/175 X |
| 2,983,125 | 5/1961 | Peickii et al. ............. 464/133 X |
| 3,044,279 | 7/1962 | Atkinson . |
| 3,063,266 | 11/1962 | Rabson ................... 464/175 |
| 3,367,142 | 2/1968 | Groves et al. ............. 464/162 |
| 3,400,558 | 9/1968 | Haines ................... 464/162 |
| 3,554,561 | 1/1971 | Weinand ................. 277/134 |
| 3,572,730 | 3/1971 | Otto ..................... 277/134 X |
| 3,586,340 | 6/1971 | Otto ..................... 277/134 X |
| 3,859,894 | 1/1975 | Mundus . |
| 4,215,869 | 8/1980 | Pendleton . |
| 4,278,262 | 7/1981 | Mizutani et al. . |
| 4,282,722 | 8/1981 | Orain . |
| 4,360,209 | 11/1982 | Ukai et al. . |
| 4,460,182 | 7/1984 | Brissette . |
| 4,552,544 | 11/1985 | Beckman et al. ........... 464/162 |
| 4,573,946 | 3/1986 | Brissette . |
| 4,575,360 | 3/1986 | Brissette . |
| 4,580,996 | 4/1986 | Brissette . |
| 4,628,777 | 12/1986 | Guarr . |
| 4,669,737 | 6/1987 | Diffenderfer ............. 464/133 X |
| 4,673,188 | 6/1987 | Matsuno et al. . |
| 4,693,484 | 9/1987 | Ukai et al. . |
| 4,840,386 | 6/1989 | Peitsmeier et al. . |
| 4,927,678 | 5/1990 | Lallement . |
| 4,988,113 | 1/1991 | Chaczyk ................. 464/175 X |
| 5,006,376 | 4/1991 | Arima et al. . |
| 5,230,658 | 7/1993 | Burton . |

FOREIGN PATENT DOCUMENTS

| | | |
|---|---|---|
| 61-184222 | 8/1986 | Japan ................... 464/162 |
| 912423 | 12/1962 | United Kingdom . |
| 2134994 | 8/1984 | United Kingdom . |

*Primary Examiner*—Daniel P. Stodola
*Assistant Examiner*—Eileen A. Dunn
*Attorney, Agent, or Firm*—MacMillan, Sobanski & Todd

[57] ABSTRACT

A combined seal and boot assembly for protectively covering a telescoping connection between two shaft members in a steering shaft assembly includes a cylindrical body portion, a flexible boot portion, and a pair of sealing lips. The body portion is frictionally mounted on the end of the female splined steering shaft member. The flexible boot portion is formed from a plurality of alternating inwardly and outwardly extending corrugations. The sealing lips extend inwardly into resilient engagement with the splines formed on male splined steering shaft member. The metallic band is provided to maintain the resilient engagement with the splines formed on male splined steering shaft member. The sealing lips are urged into engagement with a higher friction portion of the male splined steering shaft member during normal use, wherein only a small amount of relative axial movement occurs between the male and female splined steering shaft members. However, when the male and female splined steering shaft members are telescopically extended by a relatively large amount, the sealing lips are moved axially off of the higher friction portion of the male splined steering shaft member.

18 Claims, 3 Drawing Sheets

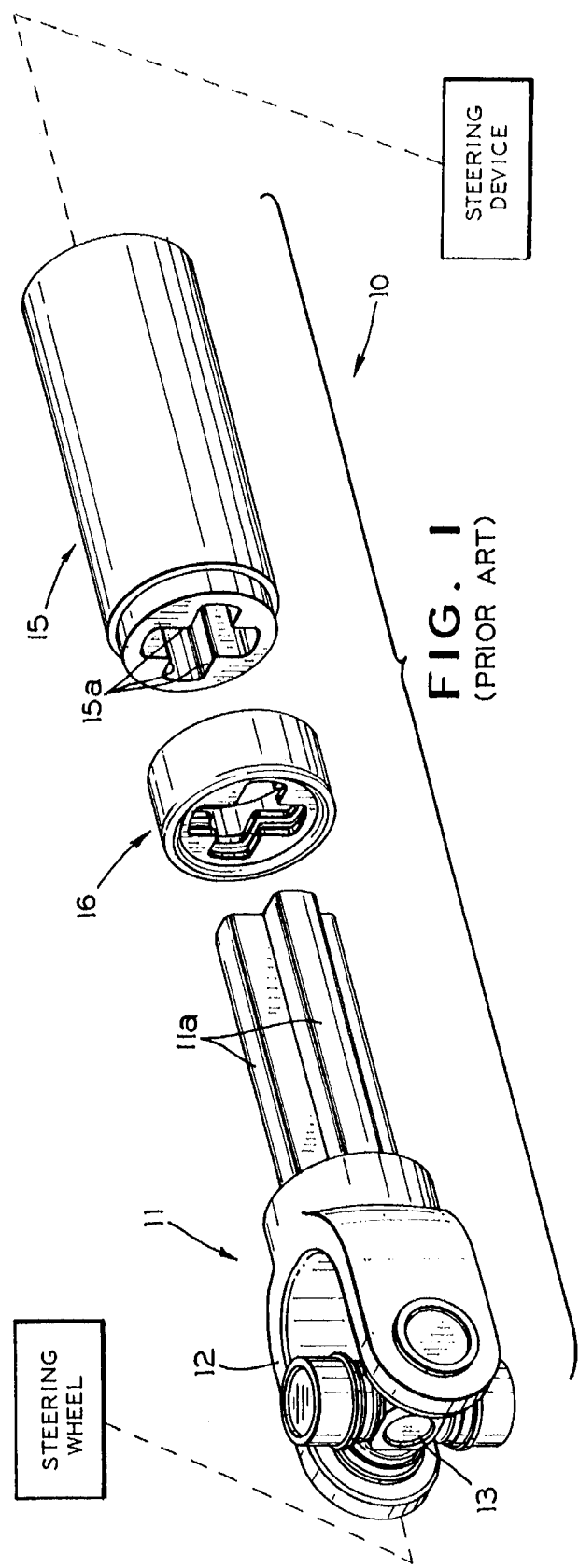
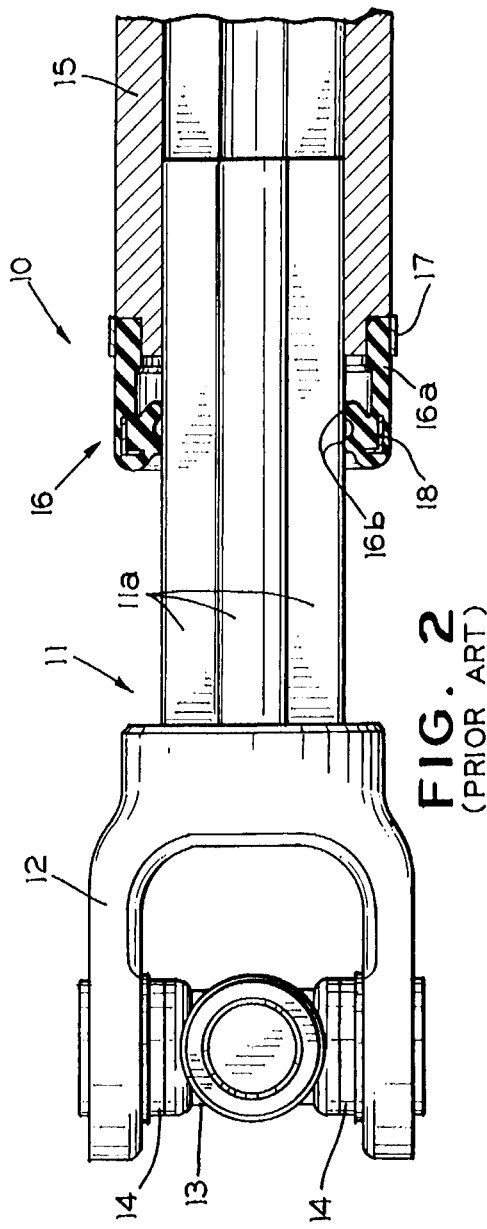
FIG. 1 (PRIOR ART)
FIG. 2 (PRIOR ART)

COMBINED SEAL AND BOOT FOR STEERING SHAFT ASSEMBLY

BACKGROUND OF THE INVENTION

This invention relates in general to seal structures and in particular to a combined seal and boot assembly for protectively covering a telescoping connection between two shaft members in a steering shaft assembly.

In virtually every road and off-road vehicle in use today, a steering system is provided for permitting a driver to control the direction of movement. A typical steering system includes a steering wheel, a steering shaft assembly, and a steering device. The steering wheel is rotatably supported within a driver compartment of the vehicle for movement by a driver. The steering shaft assembly is connected to the steering wheel for rotation therewith. The steering device is connected to the steering shaft assembly for turning the wheels of the vehicle in response to rotation of the steering wheel.

In many larger vehicles, such as trucks, the steering shaft assembly is designed not only to provide a rotational driving connection between the steering wheel and the steering device, but further to permit relative axial movement therebetween. Such axial movement has been found to be advantageous for two reasons. First, a relatively small amount of such axial movement is desirable to accommodate vibrations, bumps, and other aspects of normal vehicle operation which would otherwise be transmitted to the steering wheel. Second, when the vehicle is serviced, a relatively large amount of such axial movement is desirable to permit the cab of the vehicle to be pivoted upwardly without requiring disassembly of the steering system.

To accomplish this, it is known to construct the steering shaft assembly from cooperating male and female splined telescoping steering shaft members. The first steering shaft member is connected to the steering wheel by a first universal joint, while the second steering shaft member is connected to the steering device by a second universal joint. The universal joints are provided to permit angular displacement between the steering shaft members and the associated steering wheel and steering device. The splined connection between the first and second steering shaft members provides a rotatable driving connection between the steering wheel and the steering device, while permitting relative axial movement therebetween.

Because the two steering shaft members are usually located in an unprotected area of the vehicle, it is desirable to provide a seal to prevent dirt and other contaminants from entering into the splined connection. In the past, an elastomeric seal was mounted on the female steering shaft member. A portion of the seal extended into engagement with the male steering shaft member for sliding movement thereon. This prior art seal has functioned effectively to prevent dirt and other contaminants from entering into the splined connection. However, it has been found to be undesirable because of the constant sliding movement caused by the relatively small amount of axial movement encountered during normal use, as described above. Such constant sliding movement tends to wear not only the engaging surface of the seal, but also wipes off any lubricant which may be present on the splined male steering shaft member. Thus, it would be desirable to provide a combined seal and boot assembly for protectively covering a telescoping connection between two shaft members in a steering shaft assembly which avoids these problems.

SUMMARY OF THE INVENTION

This invention relates to a combined seal and boot assembly for protectively covering a telescoping connection between two shaft members in a steering shaft assembly. The combined seal and boot assembly is formed from an elastomeric material and includes a cylindrical body portion, a flexible boot portion, and a pair of sealing lips. The cylindrical body portion is frictionally mounted on the end of the female splined steering shaft member. If desired, a metallic band or similar structure may be provided to positively secure the cylindrical body portion on the end of the female splined steering shaft member. The flexible boot portion is formed from a plurality of alternating inwardly and outwardly extending corrugations. The sealing lips extend inwardly into resilient engagement with the splines formed on male splined steering shaft member. If desired, an annular metallic band may be provided around or embedded within the combined seal and boot assembly so as to extend circumferentially about the sealing lips. The metallic band is provided to maintain the resilient engagement with the splines formed on male splined steering shaft member. The sealing lips are urged into engagement with a higher friction portion of the male splined steering shaft member during normal use, wherein only a small amount of relative axial movement occurs between the male and female splined steering shaft members. However, when the male and female splined steering shaft members are telescopically extended by a relatively large amount, the sealing lips are moved axially off of the higher friction portion of the male splined steering shaft member.

Various objects and advantages of this invention will become apparent to those skilled in the art from the following detailed description of the preferred embodiment, when read in light of the accompanying drawings.

BRIEF DESCRIPTION OF THE DRAWINGS

FIG. 1 is an exploded perspective view of a prior art steering shaft assembly including a conventional seal.

FIG. 2 is a side sectional view of the prior art steering shaft assembly illustrated in FIG. 1, shown in an assembled condition.

DETAILED DESCRIPTION OF THE PREFERRED EMBODIMENT

Figure 3:
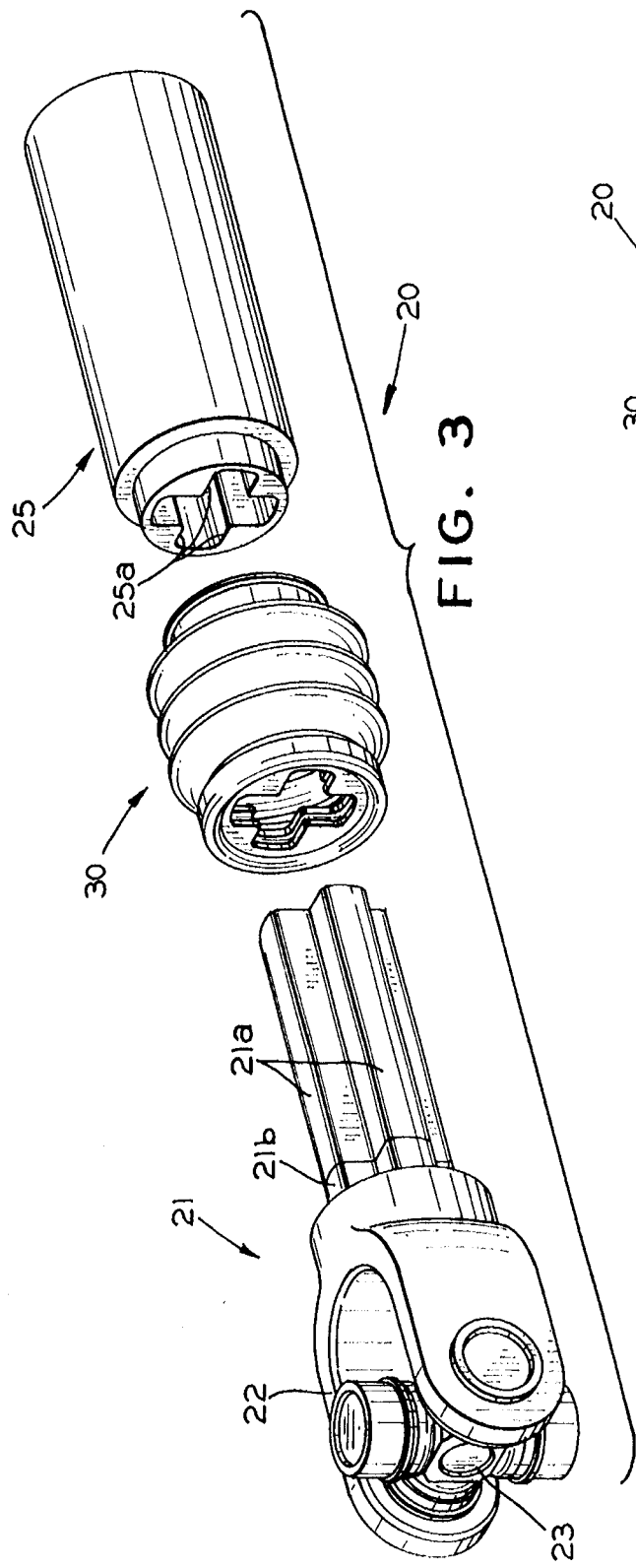
FIG. 3 is an exploded perspective view of a steering shaft assembly including a combined flexible boot and seal structure in accordance with this invention.

Referring now to the drawings, there is illustrated in FIGS. 1 and 2 a prior art steering shaft assembly, indicated generally at 10. The prior art steering shaft assembly 10 includes a male splined steering shaft member, indicated generally at 11, having a plurality of outwardly extending splines 11a formed thereon. A conventional end yoke 12 is secured to one end of the male splined steering shaft member 11 in any known manner, such as by welding. The end yoke 12 includes a pair of opposed arms having respective openings formed therethrough.

A conventional universal joint cross 13 is mounted on the end yoke 12. The cross 13 includes four outwardly extending trunnions, each having a bearing cup 14 rotatably mounted thereon. Two of the opposed bearing cups 14 are received in the opposed openings formed through the arms of the end yoke 12. Thus, the cross 13 can rotate relative to the end yoke 12. The other two opposed bearing cups 14 are adapted to be connected to a similar end yoke (not shown) carried on the end of a shaft so as to form a universal joint connection therebetween.

The steering shaft assembly 10 further includes a female splined steering shaft member, indicated generally at 15, having a plurality of inwardly extending splines 15a formed thereon. A conventional-end yoke (not shown) is secured to one end of the female splined steering shaft member 15 in any known manner, such as by welding. Similarly, the end yoke includes a pair of opposed arms having respective openings formed therethrough, and a conventional universal joint cross (not shown) is mounted on the end yoke. The universal joint crosses 13 are provided on the opposed ends of the male and female steering shaft members 11 and 15 to permit the steering shaft assembly 10 to be connected between a steering wheel and a steering device in a conventional steering system for a vehicle.

The splines 15a formed on the female splined steering shaft member 15 are complementary in size and shape to the splines 11a formed on the male splined steering shaft member 11. Thus, as is well known in the art, the male splined steering shaft member 11 can be inserted telescopically within the female splined steering shaft member 15. The cooperating splines 11a and 15a formed on the male and female splined steering shaft members 11 and 15, respectively, provide a rotational driving connection therebetween, while permitting relative axial movement. To facilitate such axial movement, the splines 11a formed on the male splined shaft member 11 may be permanently coated with any known low friction material, such as nylon. Also, lubricant is usually provided in the region of the mating splines 11a and 15a.

The illustrated male and female splined steering shaft members 11 and 15 are each formed having four outwardly extending splines 11a and 15a which are equally spaced apart from one another. Such a four bar spline has been found to be desirable when the steering shaft assembly 10 is connected between a steering wheel (not shown) and a steering device (not shown) in a vehicle. In this application, the steering shaft assembly 10 generally does not rotate or move axially a large amount during normal use. Nonetheless, it will be appreciated that the splines 11a and 15a may be formed of any desired number, size, or spacing.

A conventional seal, indicated generally at 16, is provided for protectively covering the region of the mating splines 11a and 15a of the male and female splined steering shaft members 11 and 15, respectively. The seal 16 is usually formed from an elastomeric material and includes a cylindrical body portion 16a which is frictionally mounted on the end of the female splined steering shaft member 15. If desired, a metallic band 17 or similar structure may be provided to positively secure the cylindrical body portion 16a on the end of the female splined steering shaft member 15.

The seal 16 further includes a pair of sealing lips 16b which extend inwardly into resilient engagement with the splines 11a formed on male splined steering shaft member 11. If desired, an annular metallic band 18 may be provided around or embedded within the seal 16 so as to extend circumferentially about the sealing lips 16b. The metallic band 18 is provided to maintain the resilient engagement with the splines 11a formed on male splined steering shaft member 11. Because of this resilient engagement, the sealing lips 16b prevent dirt and other contaminants from entering into the region of the mating splines 11a and 15a.

Inasmuch as the cylindrical body portion 16a of the seal 16 is secured onto the end of the female splined steering shaft member 15, the male splined steering shaft member 11 can move axially relative to both the female splined steering shaft member 15 and the seal 16. When this occurs, the sealing lips 16b slide along the splines 11a formed on male splined steering shaft member 11 to accommodate such movement while protectively covering the region of the mating splines 11a and 15a.

Figure 4:
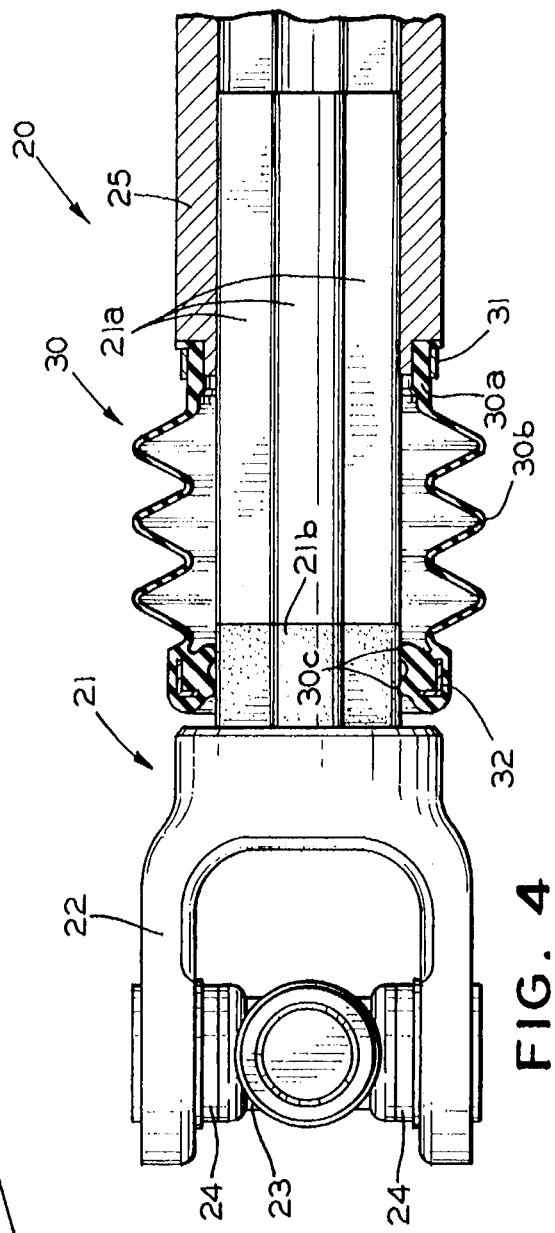
FIG. 4 is a side sectional view of the steering shaft assembly and combined flexible boot and seal structure illustrated in FIG. 1, shown in an assembled condition.
Figure 5:
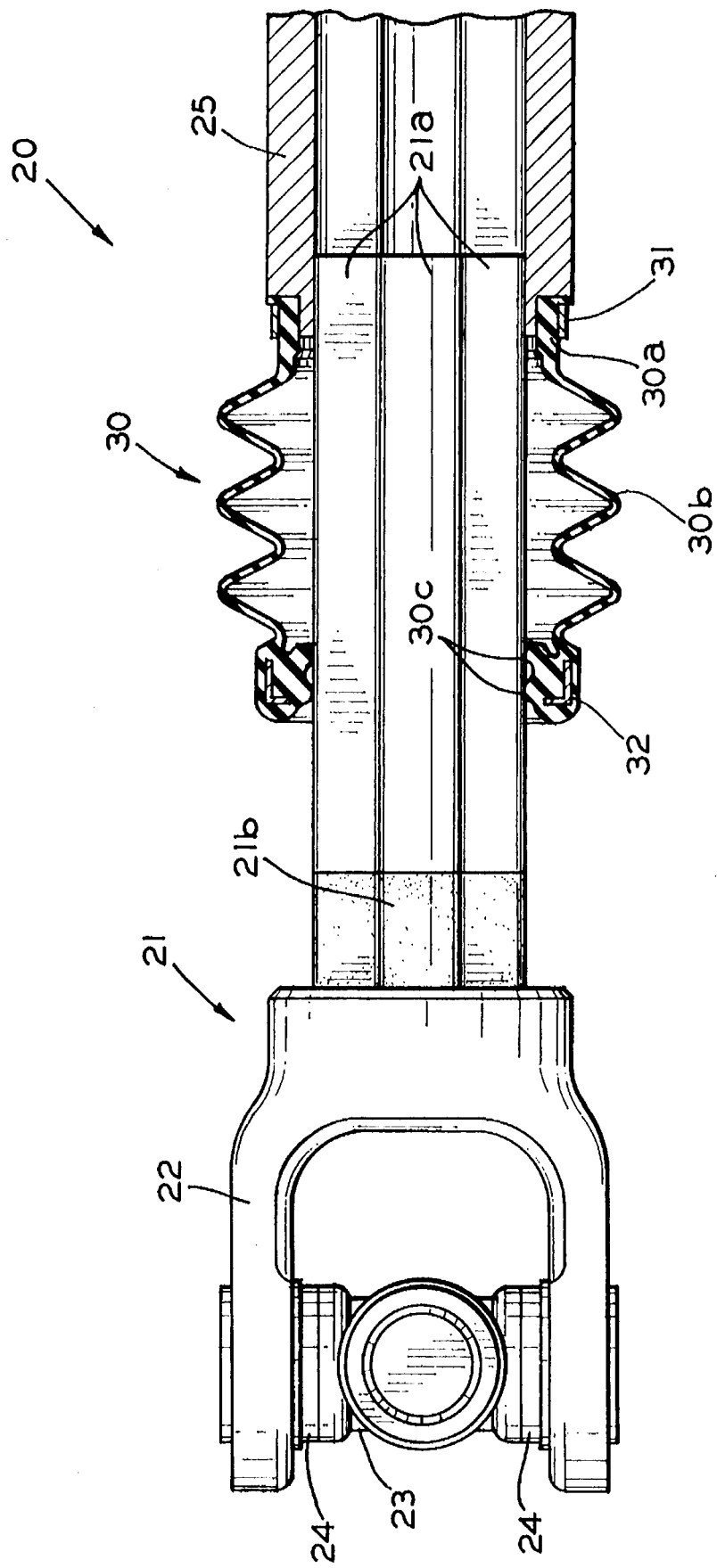
FIG. 5 is a side sectional view similar to FIG. 4 showing the steering shaft assembly and combined flexible boot and seal structure in an extended position.

Referring now to FIGS. 3, 4, and 5, there is illustrated an improved steering shaft assembly, indicated generally at 20, in accordance with this invention. The steering shaft assembly 20 includes a male splined steering shaft member, indicated generally at 21, having a plurality of outwardly extending splines 21a formed thereon. A conventional end yoke 22 is secured to one end of the male splined steering shaft member 21 in any known manner, such as by welding. The end yoke 22 includes a pair of opposed arms having respective openings formed therethrough.

A conventional universal joint cross 23 is mounted on the end yoke 22. The cross 23 includes four outwardly extending trunnions, each having a bearing cup 24 rotatably mounted thereon. Two of the opposed bearing cups 24 are received in the opposed openings formed through the arms of the end yoke 22. Thus, the cross 23 can rotate relative to the end yoke 22. The other two opposed bearing cups 24 are adapted to be connected to a similar end yoke (not shown) carried on the end of a shaft so as to form a universal joint connection therebetween.

The steering shaft assembly 20 further includes a female splined steering shaft member, indicated generally at 25, having a plurality of inwardly extending splines 25a formed thereon. A conventional end yoke (not shown) is secured to one end of the female splined steering shaft member 25 in any known manner, such as by welding. Similarly, the end yoke includes a pair of opposed arms having respective openings formed therethrough, and a conventional universal joint cross (not shown) is mounted on the end yoke. The universal joint crosses 23 are provided on the opposed ends of the male and female steering shaft members 21 and 25 to permit the steering shaft assembly 20 to be connected between a steering wheel and a steering device in a conventional steering system for a vehicle.

The splines 25a formed on the female splined steering shaft member 25 are complementary in size and shape to the splines 21a formed on the male splined steering shaft member 21. Thus, as is well known in the art, the male splined steering shaft member 21 can be inserted telescopically within the female splined steering shaft member 25. The cooperating splines 21a and 25a formed on the male and female splined steering shaft members 21 and 25, respectively, provide a rotational driving connection therebetween, while permitting relative axial movement.

To facilitate such axial movement, the splines 21a formed on the male splined shaft member 21 may be permanently coated with any known low friction material, such as nylon. However, unlike the male splined steering shaft member 11 described above, a portion 21b of the surface of the male splined steering shaft member 21 located adjacent to the end yoke 22 is not coated with the low friction material. Rather, such surface portion 21b of the male splined steering shaft member 21 is formed having a relative rough texture. As a result, the surface portion 21b of the male splined steering shaft member 21 has a higher coefficient of friction than the remaining surface portion thereof. The purpose of this higher friction surface portion 21b will be explained below. Lubricant may be provided in the region of the mating splines 21a and 25a.

The illustrated male and female splined steering shaft members 21 and 25 are each formed having four outwardly extending splines 21a and 25a which are equally spaced apart from one another. Such a four bar spline has been found to be desirable when the steering shaft assembly 20 is connected between a steering wheel (not shown) and a steering device (not shown) in a vehicle. In this application, the steering shaft assembly 20 generally does not rotate or move axially a large amount during normal use. Nonetheless, it will be appreciated that the splines 21a and 25a may be formed of any desired number, size, or spacing.

A combined seal and boot assembly, indicated generally at 30, is provided for protectively covering the region of the mating splines 21a and 25a of the male and female splined steering shaft members 21 and 25, respectively. The combined seal and boot assembly 30 is formed from an elastomeric material and includes a cylindrical body portion 30a which is frictionally mounted on the end of the female splined steering shaft member 25. If desired, a metallic band 31 or similar structure may be provided to positively secure the cylindrical body portion 30a on the end of the female splined steering shaft member 25.

The combined seal and boot assembly 30 further includes a flexible boot portion 30b which is preferably formed integrally with the cylindrical body portion 30a. As shown in the drawings, the flexible boot portion 30b is formed from a plurality of alternating inwardly and outwardly extending corrugations. Lastly, the combined seal and boot assembly 30 includes a pair of sealing lips 30c which are preferably formed integrally with the flexible boot portion 30b. The sealing lips 30c extend inwardly into resilient engagement with the splines 21a formed on male splined steering shaft member 21. If desired, an annular metallic band 32 may be provided around or embedded within the combined seal and boot assembly 30 so as to extend circumferentially about the sealing lips 30c. The metallic band 32 is provided to maintain the resilient engagement with the splines 21a formed on male splined steering shaft member 21. Because of this resilient engagement, the sealing lips 30c prevent dirt and other contaminants from entering into the region of the mating splines 21a and 25a.

As shown in FIG. 4, the combined seal and boot assembly 30 is installed such that the sealing lips 30c are urged into engagement with the higher friction surface portion 21b of the male splined steering shaft member 21. Thus, the sealing lips 30c are normally maintained in contact with this higher friction surface portion 21b, even when a small amount of relative axial movement occurs between the male and female splined steering shaft members 21 and 25, respectively. As discussed above, the cylindrical body portion 30a of the combined seal and boot assembly 30 is secured onto the end of the female splined steering shaft member 25. Consequently, relative axial movement between the male and female splined steering shaft members 21 and 25 is accommodated by the flexible boot portion 30b. Accordingly, the sealing lips 30c do not move axially along the splines 21a of the male splined steering shaft member 21 during normal operation of the steering shaft assembly 20.

As discussed above, a relatively large amount of relative axial movement between the male and female splined steering shaft members 21 and 25 is desirable in certain situations. For example, when the vehicle in which the steering shaft assembly 20 is installed requires service, it is desirable to permit the cab of the vehicle to pivot upwardly without disassembling the steering system. To allow this, the male and female splined steering shaft members 21 and 25 are telescopically extended by a relatively large amount, such as shown in FIG. 5. When this occurs, the sealing lips 30c of the combined seal and boot assembly 30 are moved axially off of the higher friction surface portion 21b of the male splined steering shaft member 21. When the male and female splined steering shaft members 21 and 25 are telescopically retracted back to the position illustrated in FIG. 4, the sealing lips 30c are returned onto the higher friction surface portion 21b of the male splined steering shaft member 21.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A shaft assembly for providing a rotational driving connection between a first component and a second component while permitting relative axial movement therebetween, said shaft assembly comprising:

a female shaft member having a plurality of inwardly extending splines;

a male shaft member having a plurality of outwardly extending splines, a portion of said male shaft member being telescopically received within said female shaft member such that said outwardly extending splines cooperate with said inwardly extending splines to provide a rotational driving connection between said male and female shaft members while permitting relative axial movement therebetween, said male shaft member including a first splined surface portion having a relative high coefficient of friction and a second splined surface portion having a relative low coefficient of friction; and a combined seal and boot assembly including a cylindrical body portion secured to said female shaft member, a flexible boot portion extending from said body portion, and sealing lip extending from said boot portion into sealing engagement with said first splined surface portion of said male shaft member.

2. The shaft-assembly defined in claim 1 wherein said boot portion is formed having a plurality of flexible corrugations.

3. The shaft assembly defined in claim 1 wherein said sealing lip is a first sealing lip and further including a second sealing lip.

4. The shaft assembly defined in claim 3 wherein said second sealing lip extends from said, boot portion into sealing engagement with said first splined surface portion of said male shaft member.

5. The shaft assembly defined in claim 1 wherein said boot portion is formed integrally with said body portion.

6. The shaft assembly defined in claim 1 wherein said sealing lip is formed integrally with said boot portion.

7. The shaft assembly defined in claim 1 wherein said boot portion is formed integrally with said body portion and said sealing lip is formed integrally with said boot portion.

8. The shaft assembly defined in claim 7 wherein said combined seal and boot assembly is formed from an elastomeric material.

9. The shaft assembly defined in claim 1 wherein said first splined surface portion of said male shaft member is located adjacent an end thereof.

10. A steering system for a vehicle comprising:

a steering wheel;

a steering device; and a steering shaft assembly for providing a rotational driving connection between said steering wheel and said steering device, said steering shaft assembly including:

a female steering shaft member having a plurality of inwardly extending splines;

a male steering shaft member having a plurality of outwardly extending splines, a portion of said male steering shaft member being telescopically received within said female steering shaft member such that said outwardly extending splines cooperate with said inwardly extending splines to provide a rotational driving connection between said male and female steering shaft members while permitting relative axial movement therebetween, said male steering shaft member including a first splined surface portion having a relative high coefficient of friction and a second splined surface portion having a relative low coefficient of friction; and a combined seal and boot assembly including a cylindrical body portion secured to said female steering shaft member, a flexible boot portion extending from said body portion, and a sealing lip extending from said boot portion into sealing engagement with said first splined surface portion of said male steering shaft member.

11. The steering system defined in claim 10 wherein said boot portion is formed having a plurality of flexible corrugations.

12. The steering system defined in claim 10 wherein said sealing lip is a first sealing lip and further including a second sealing lip.

13. The steering system defined in claim 12 wherein said second sealing lip extends from said boot portion into sealing engagement with said first splined surface portion of said male steering shaft member.

14. The steering system defined in claim 10 wherein said boot portion is foraged integrally with said body portion.

15. The steering, system defined in claim 10 wherein said sealing lip is formed integrally with said boot portion.

16. The steering system defined in claim 10 wherein said boot portion is formed integrally with said body portion and said sealing lip is formed integrally with said boot portion.

17. The steering system defined in claim 16 wherein said combined seal and boot assembly is formed from an elastomeric material.

18. The steering system defined in claim 16 wherein said first splined surface portion of said male steering shaft member is located adjacent an end thereof.

* * * * *